United States Patent [19]

Stechler

[11] 4,273,806
[45] Jun. 16, 1981

[54] METHOD OF FORMING ELECTRICAL INSULATION BY EXTRUDING POLYMERIC COMPOSITIONS CONTAINING HOLLOW MICROSPHERES

[76] Inventor: Bernard G. Stechler, 766 Brady Ave., Bronx, N.Y. 10462

[21] Appl. No.: 84,637

[22] Filed: Oct. 15, 1979

Related U.S. Application Data

[60] Continuation of Ser. No. 892,780, Apr. 3, 1978, abandoned, which is a continuation of Ser. No. 780,231, Mar. 22, 1977, abandoned, which is a division of Ser. No. 709,877, Jul. 29, 1976, abandoned.

[51] Int. Cl.³ .............................................. B05D 5/12
[52] U.S. Cl. ................................... 427/119; 260/42; 264/134; 264/174; 427/120; 427/358; 427/398.1
[58] Field of Search .......... 427/119, 120, 358, 398 R; 264/45.9, DIG. 6, 134, 174; 260/42

[56] References Cited

U.S. PATENT DOCUMENTS

| | | | |
|---|---|---|---|
| 2,978,340 | 4/1961 | Veatch | 106/75 |
| 2,994,624 | 8/1961 | Lit et al. | 427/358 |
| 3,480,725 | 11/1969 | Mildner | 427/119 |
| 3,558,591 | 1/1971 | Yendrik | 260/39.5 B |
| 3,573,976 | 4/1971 | Duane | 427/119 |
| 3,830,776 | 8/1974 | Carlson et al. | 260/37 EP |
| 3,902,937 | 9/1975 | Arndt et al. | 427/119 |
| 3,917,547 | 11/1975 | Massey | 260/2.5 AK |
| 4,016,229 | 4/1977 | Tobin | 106/DIG. 1 |
| 4,046,849 | 9/1977 | Lever et al. | 427/358 |

OTHER PUBLICATIONS

Raask E., "Cenospheres in Pulverized-Fuel Ash", Journal of the Institute of Fuel, 9-1968.

Primary Examiner—John D. Smith
Attorney, Agent, or Firm—Sherman & Shalloway

[57] ABSTRACT

A method is disclosed for forming electrical insulation about a wire conductor using thermoplastic polymers, combined with hollow microspheres formed from silica and alumina. The hollow microspheres are naturally occurring materials found in water.

New extrusion molding, compression molding and injection molding techniques allow faster production rates without any substantial breakage of the hollow microspheres.

1 Claim, No Drawings

METHOD OF FORMING ELECTRICAL INSULATION BY EXTRUDING POLYMERIC COMPOSITIONS CONTAINING HOLLOW MICROSPHERES

This is a continuation of application Ser. No. 892,780, filed Apr. 3, 1978 which is in turn a continuation of Ser. No. 780,231, filed Mar. 22, 1977 which is in turn a division of Ser. No. 709,877, filed July 29, 1976 all now abandoned.

FIELD OF THE INVENTION

This invention relates to thermoplastic and thermosetting polymeric compositions which have been modified by incorporating therein low density hollow inorganic microsphere fillers, and to extrusion, compression and injection molding techniques using the filled polymeric compositions.

DISCUSSION OF THE PRIOR ART

There have been many proposals in the past for incorporating light weight particulate matter of various compositions, e.g., natural, synthetic, organic or inorganic, glass, etc. into various types of matrices, usually polymeric.

For instance, Wismer, et al., in the U.S. Pat. No. 3,707,414, describes thermal insulation material formed by incorporating hollow alumina spheres in foamed phenolplast resins. Malthouse, U.S. Pat. No. 3,832,426, describes products containing carbon microspheres in carbon matrices formed from hollow phenolic or other carbonizable resin microspheres incorporated in a carbonizable resin matrix which is thereafter subjected to sufficient heating to carbonize the microspheres and matrix. A similar product is disclosed by Benton, in U.S. Pat. No. 3,810,963.

Light weight epoxy resin or polyester resin materials having incorporated therein hollow acrylic resin balls or hollow alumina or alumina alloy balls with diameters in the range of 1½ to 1¾ inches are described by Stayner in U.S. Pat. No. 3,608,010. According to Reid, U.S. Pat. No. 3,046,172, flexible resilient cellular articles formed from a solid elastomeric material, such as polyethylene or plasticized polyvinyl chloride, are admixed with a plurality of hollow friable clay particles having diameters of 0.01-1 millimeter, the friable particles being subsequently crushed to form a plurality of pores in the elastomeric material matrix.

A gasket material formed with 20-80 volume percent of hollow, rigid, collapsible glass or inorganic material microspheres having diameters of from 10-300 microns incorporated into various elastomeric materials is described in U.S. Pat. No. 3,524,794 to Jonnes, et al.

Massey, U.S. Pat. No. 3,917,547, discloses flexible polyurethane foams having improved compression strength which are produced by incorporating "cenospheres" into polyurethane foam. The "cenospheres" are obtained from fly ash. They average 10-200 microns in diameter, are coherent, non-porous shells of silica glass. The "cenospheres" have a true particle density in the range of 15-50 pounds per cubic foot and a random bulk density of 10-40 pounds per cubic foot. Massey also suggests that fly ash containing "cenospheres" can be added to other foams, such as polystyrene and polyvinyl chloride foams, as well as specialty foams using polyesters, epoxy resins, phenolics, polyethylene, polypropylene, ABS and ABA. However, there are no examples given of compositions of these other polymer foams with the "cenospheres".

The use of glass microspheres as fillers or reinforcement for plastics has been recently described in *Design News*, June 3, 1974, in an article title "Reinforced Plastic Comes of Age".

However, while these prior art compositions are readily adaptable for static molding operations, such as casting in place, none of these compositions are entirely satisfactory with regard to compression molding, injection molding or extrusion because of low production rates, breakage of the microspheres and clogging of the equipment. Moreover, the prior art does not suggest that the electrical insulation properties of the various thermosetting and thermoplastic polymeric materials can be substantially improved by incorporating therein the hollow microsphere filler particles.

SUMMARY OF THE INVENTION

It has now been found that these and other drawbacks of the prior art can be avoided by incorporating a specific type of hollow silica-alumina microsphere as fillers for thermosetting and thermoplastic polymeric materials and by molding the filled polymer compositions under specific operating conditions. The novel compositions of the present invention containing the polymeric material and the filler materials provide for increased production rates in the various molding applications, i.e., injection molding, compression molding and extrusion.

The novel polymeric compositions and processes of the present invention provide shaped articles having improved electrical and thermal insulation properties and, therefore, have particular utility in such application as insulation for electrical cells, wires and enclosures, thermal insulation and building materials. Furthermore, because of their capability for higher extrusion and injection molding rates than previously possible, these compositions provide significant reductions in production costs.

Accordingly, the present invention provides novel polymeric compositions having improved physical, chemical and electrical properties, methods for preparing such compositions and injection, compression and extrusion molding techniques for producing shaped articles from the polymeric compositions. The present invention also provides polymeric compositions having improved capabilities for compression molding, injection molding and extrusion into shaped articles.

In another aspect, the present invention provides novel molding techniques for producing molded plastic articles containing therein hollow microspherical filler particles without significant breakage of the particles and at higher production rates than previously possible.

In order to obtain these and other objectives, the present invention provides polymeric compositions containing up to 50 volume percent of filler material which are hard, inert silica-alumina, low density hollow microspheres ranging from 5 to 300 microns in diameter.

The novel molding procedures for extrusion, compression and injection molding are based on the discovery that by not passing the filled compositions through any orifices or passageways whose minimum diameter is less than one-sixteenth (1/16) inch and by operating at relatively narrow ranges of and relationships between feed rates, pressure and temperatures, breakage of the hollow microspheres is substantially completely prevented and production rates are significantly increased. The maximum permissible operating pressure is 1000 pounds per square inch (psi) for injection molding and 1600 psi for extrusion and 2000 psi for compression molding.

The filled polymeric plastic composition of the present invention are generally provided in the form of pellets which is the most advantageous form for further handling. The pellets are formed by mixing the hollow microspheres, which occur as freely flowing powders, with the polymeric material which can be used in the commercially available powder, pellet or liquid form followed by extrusion, according to the hereinbelow described technique and pelletization according to any conventional and customary procedure. However, for the thermosetting polymeric materials such as the phenolic resins it is preferred to treat the hollow microspheres with a treating liquid to further increase the compatability between the filler particles and the thermosetting polymeric resin.

DETAILED DESCRIPTION OF THE INVENTION

The filler materials used in the plastic, moldable compositions of the present invention are hard inert silica-alumina particles in the form of high strength hollow microspheres whose diameters range from 5 to 300 microns. The materials consist of approximately 55–60 percent by weight of silica ($SiO_2$) and 30–35 percent by weight of alumina ($Al_2O_3$). Iron oxide ($Fe_2O_3$) constitutes the major portion of the remainder of the particles and is generally present in amounts of from 4–10 percent by weight. Traces of alkali and alkaline earth metals and oxides thereof, in amounts of from about 0.5 to 2 or 3 percent can also be present in the filler materials.

These filler materials are generally regular non-porous spheres having a shell thickness which is about 10 percent of the radius. Their specific gravity ranges from about 0.35 to about 0.7. The bulk density is about 11 to about 25 pounds per cubic foot while their true density is about 0.4 to about 0.6 grams per cubic centimeter. These silica-alumina filler materials are further characterized by a melting point of about 1200° C. and have a hardness (MOH's particle) equal to about 5. These materials are naturally occurring materials found in water.

The hollow microsphere fillers are incorporated in the polymers in amounts up to about 50 volume percent. To achieve a significant improvement in the moldability as well as thermal and electrical insulation properties provided by these filler materials, it is preferred to incorporate at least about 5 volume percent of the fillers in the plastic compositions.

A variety of thermoplastic and thermosetting materials can be used in the compositions and methods of the present invention. The thermoplastic materials which have been found to be especially useful include polyolefins, such as polyethylene and polypropylene; polyesters; vinyl polymers, such as polyvinyl chlorides and polystyrene; and polyamides, including all of the different types of nylons. Copolymers, such as ABS resins, can also be used. The thermosetting polymers include phenolic resins, such as the novalaks and resoles, melamine-formaldehyde resin, urea-formaldehyde, etc., and the epoxy resins, such as the adducts of bisphenol A and epichlorohydrin and similar well-known epoxies. Of these, the preferred polymeric materials are polyethylene, polypropylene, polyvinyl chloride and the phenolic resins.

The filled polymeric plastic compositions of the present invention have improved thermal and electrical properties as compared to the plastic materials not containing these fillers. Specific improvements in the properties of the filled polymeric plastic compositions of the present invention include better compatability with solvents, melting and distortion temperature, cold flow on distress, dimensional stability, general thermal index, long term thermal aging strength, thermal conductivity, softening temperature, dielectric constant dissipation factor, are resistance and temperature classification. They also exhibit improved chemical properties such as resistance to strong and weak alkalis and acids and organic solvents, improved burning rates and water absorption characteristics. Furthermore, the polymeric compositions containing the hollow silica-alumina microsphere fillers of the present invention, depending on the surface area of the end product and percent of hollow microspheres, permit increases of up to 100% in production rates during injection molding and extrusion without any significant breakage by following the novel molding techniques and parameters of the present invention. It is also possible to carry out the compression molding, injection molding and extrusion operations at higher temperatures than have previously been employed because of the insulating properties imparted to the plastic composition by the hollow microsphere fillers.

In mixing the plastic resin materials and the fillers, the plastic resins are generally provided in their commercial powder or pellet form. The ingredients are then mixed in any conventional mixing device, such as a Banbury mixer. It is an advantage of the compositions of the present invention that the filler materials are compatible with the polymeric materials and especially the thermoplastic resins and form homogeneous compositions. It is particularly useful to pelletize the filled polymeric compositions prior to any subsequent shaping operations in order to assure continued compatibility. It has been found that, when the filled polymers are formed into pellets, there will be no separation of the filler materials from the polymeric matrices, as is more readily possible in powder and liquid forms. In accordance with the present invention it has been demonstrated that the compositions can be formed into pellets without any significant breakage of the hollow microspheres by carrying out the extrusion under carefully prescribed conditions of temperature and pressure and volume rate of feed of the hollow microspheres.

In carrying out the mixing with a Banbury mixer, low pressures are used at a drop temperature of 300°–350° F. and an extruded temperature of 400° F. Pelletization is typically through a 20° mesh screen.

It is also possible to separately feed the microspheres and polymer in separate feed lines and combine the ingredients directly in the mixer.

The rate of feed, in pound per second $=\rho AV$. At a given density and surface area, assuming that 50% by volume of the microspheres fillers and polymers are mixed together can result, depending on the densities, in a mixture containing 20% by weight of the microspheres and 80% by weight of polymer. The velocity is then readily calculated.

While conventional extrusion apparatus can generally be used in the extrusion process of the present invention it is imperative that the extrusion orifice have a diameter of at least one-sixteenth (1/16) inch. There is no particular upper limit of the diameter. If the extruder only has a single feed inlet it is preferable to provide an additional feed inlet when the mixing of polymer resin and hollow microsphere filler particles is to be performed directly in the extruder.

In general, the operating pressure in the extruder must be less than 1600 pounds per square inch (psi) with a temperature increase on the order of 50° to 100° C. depending on the volume percentage of the filter particles based on the total volume of resin and filler.

The specific relationship between the volume percent of the hollow microshpere filler particles, operating pressure in the extruder and temperature increase ($\Delta T$), which represents the temperature of the polymer resin in the extruder minus the polymer temperature before it enters the extruder, i.e., the temperature of the polymer melt or softening temperature of the polymer, can best be expressed in terms of the following table:

TABLE A

| | Process Parameters For Extrusion and Injection Molding | | | |
|---|---|---|---|---|
| | Extrusion | | Injection | |
| Volume (%) of Microspheres | Operating Pressure (psi) | $\Delta T$ (°C.) | Operating Pressure (psi) | $\Delta T$ (°C.) |
| 5–20 | 1600 | 80 | 1000 | 50 |
| 25 | 1550 | 90 | 970 | 60 |
| 30 | 1500 | 100 | 950 | 70 |
| 35 | 1430 | 110 | 925 | 80 |
| 40 | 1350 | 120 | 900 | 90 |
| 45 | 1210 | 140 | 900 | 95 |
| 50 | 1100 | 150 | 900 | 100 |

Although it is permissible to vary the above parameters within ±10% of the indicated values without serious adverse results it is preferred to operate as closely as possible to the values given in Table A. For volume percent of microspheres falling between the listed values the operating pressure and temperature can be determined by linear interpolation between the next lower and next higher values given in Table A.

The hollow silica-alumina microsphere particles are in the form of a freely flowing powder which is formed into a homogeneous mixture with the polymer resin. The latter is generally used in the commercially available powder or pellet form but can also be used in the commercially available liquid form, such as liquid polypropylene.

The microsphere filler particles and polymeric resin are intermittently or continuously metered into the extrusion apparatus for uniform, homogeneous mixing prior to extrusion through the extrusion orifice at a rate (feed velocity) which is a function of their individual densities, surface areas, and volume percentages. In general, the feed velocity is indirectly proportional to the density. Generally the flow rate in pounds per second-$\rho AV$ and the same consideration as for the mixing apply.

For the thermosetting polymeric materials, such as the phenolic resins, it has been found advantageous to pre-mix the hollow silica microsphere filler particles with a liquid binder which is compatible with the phenolic resin which can be in powder, pellet or liquid form. Examples of such liquid binders are the aldehydes, such as formaldehyde, paraformaldehyde, hexamethylene tetramine and furfural, the latter being particularly preferred. The hollow microsphere fillers are generally premixed with about 1 percent to about 5 percent by weight of the liquid and phenolic resin.

Thereafter, the pre-mix is combined with the remainder of the phenolic resin.

It has also been found advantageous to add an additional inert material for filling and extending the phenolic resin composition to impart additional strength properties to the filled composition. Examples of these inert filler materials include silica, kaolinite clay, wood flour, etc. This additional inert filler material can be combined with the pre-mix in an amount which will not adversely affect the properties of the final composition.

The corresponding relationship between the volume percent, operating pressure and temperature increase for compression molding according to the requirements of the present invention is best expressed in terms of the following table:

TABLE B

| | Process Parameters for Compression Molding | |
|---|---|---|
| Volume (%) of Microspheres | Operating Pressure (psi) | $\Delta T$ (°C.) |
| 10 | 2000 | 30 |
| 20 | 1500 | 60 |
| 30 | 1250 | 90 |
| 40 | 1000 | 120 |
| 50 | 750 | 150 |

Again, it is possible to operate with ±10% of the above values and for volume percents falling between the above values linear interpolation is suitable.

The advantageous cooling down property imparted to the polymeric materials, when combined with the molding operating parameters outlined in Tables A and B, above, permit much faster production rates than are possible with unfilled polymeric resins or resins filled with conventional filler materials such as glass beads or fibers, etc.

For extrusion and injection molding the cooling down rate of the extruded or injected article can be, depending on the surface area of the filler particles, almost twice that of the same polymer resin without the hollow microsphere filler particles. Similarly, for compression molding operations with the filled polymer resins of the present invention the time for setting can be as little as one-half the set time for the corresponding unfilled resin. In addition, the filled polymer will reach the melt stage more rapidly than the unfilled resin. It is therefore understood that the cycle times for the extrusion, injection and compression molding operations following the parameters of the present invention with respect to volume feed rates, pressures and temperatures can be cut in half over conventional techniques while at the same time providing plastic articles having improved physical, chemical and electrical properties by virtue of the presence of from 5 to 50 percent by volume of the unbroken hollow silica-alumina microspheres.

The compositions of the present invention have general applicability in compression and injection molding operations and in the preparation of shaped articles by extrusion. For example, the compositions of the present invention can be used in forming structural materials having high impact strength, high thermal insulation characteristics, dielectric potting and encapsulating resins, molding compositions for electronic applications, light weight tooling resins, etc. A particular application for the filled thermoplastic compositions of the present invention, and particularly the filled polyethylene, polypropylene and polyvinyl chloride resin compositions, as in the extrusion (pultrusion) of electrical wire insulation.

It is well known in the art to directly extrude polymeric materials around wire cores as insulation and to pull the insulated wire through the extrusion die at a rate equivalent to the solidification rate of the polymeric insulation. However, the production rates of these insulated wires is limited by the slow solidification of the extruded polymer because of the slow cooling down rate of the polymer in the ambient atmosphere. However, because of the advantageous cooling down characteristics of the filled polymeric compositions of the present invention, it is possible, using the conventional extrusion techniques, often referred to as "pultrusion", to effectively increase and even double the production rates of the electrically insulated wires.

The filled thermoplastic and thermosetting resin of the present invention have such applications as automotive, e.g., distributor caps, battery casing, electrical wire insulation, etc.; wet-dry applications; self-lubricating parts; physical-shock endurance parts; appliances, e.g., pot handles, knobs and appliance bases; and electrical/electronic enclosures, such as connectors, wiring devices, circuit breakers, junction boxes, watt-hour meter bases, etc.

EXAMPLE I

Commercially available polypropylene powder (Moplen, sold by Novamont Corp., New York) was mixed with about 40 volume percent of the hollow silica-alumina microsphere fillers of the present invention in a Banbury mixer to form a homogeneous mixture which was then extruded at a pressure of about 900 psi and pelletized to form pellets of about ⅛ inch by ⅛ inch. The pellets were injection molded at about 300° C. at a rate of about 10 cycles per hour without any significant breakage of the microsphere fillers.

When the polypropylene pellets without the microspheres were injection molded under the same conditions, it was only possible to operate at about 5 cycles per hour. The physical and electrical properties of the end product were substantially improved in the case of the filled polymeric insulation covering.

EXAMPLE II

In this example, commercially available polypropylene pellets were mixed with the silica-alumina microsphere fillers in equal proportions (50% volume of each) and under the same conditions using the same extruder used in Example I and were pelletizied to form pellets of ⅛ by ⅛ inch. The pellets formed in this manner were also injection molded at 300° C. at about 10 cycles per hour without particle breakage. Using the same pellets without repelletizing with the microspheres it was only possible to operate at 5 cycles per hour and the physical and electrical properties of the end product were substantially improved in the case of the filled polymeric insulation covering.

EXAMPLE III

Example I was repeated replacing the polypropylene powder with a commercially available polyvinyl chloride powder to form filled PVC pellets of ⅛ by ⅛ inch which were used in an extruder. The production rates for extrusion of the polyvinyl chloride pellets, containing uniformly mixed therein the hollow silica-alumina microsphere filler particles of the present invention, is 40 percent higher than possible without the filler materials contained therein. Better physical, electrical, thermal and chemical properties resulted. Similiar results are obtained using polypropylene and polyethylene after the extrosion.

EXAMPLE IV

A filled thermosetting polymeric composition is prepared using a commercially available melamine-formaldehyde or other phenolic resin and the hollow silicate microspheres of the present invention by first premixing the filler particles with sufficient liquid binder to coat the surfaces of the particles and blending with about 3 percent by weight of the phenolic resin. The coated filler particles are then blended with an additional filler material, such as wood flour. Thereafter, the remaining phenolic resin is blended with the coated filler particles and the whole is uniformly mixed.

The thus compounded formulation is shaped into formed articles by compression molding resulting in a 25 percent increase in cycle time and better physical, electrical, thermal and chemical properties resulted.

I claim:

1. In a method of forming electrical insulation about a wire conductor by passing said wire conductor through a bath of a thermoplastic resin whereby said resin adheres to and forms a coating around said wire and pulling the resin coated wire through a circular die of an extruder while allowing the polymeric resin to solidify by cooling down in the ambient atmosphere, whereby the coated wire is pulled through the circular die at a rate equivalent to the cooling down rate of the polymeric resin, the improvement comprising using as said thermoplastic polymeric resin the composition comprising a uniform mixture of a thermoplastic polymeric material which is selected from the group consisting of polyethylene, polypropylene and polyvinyl chloride resin and, as a filler, from 5 to 50 percent by volume of inert silica-alumina, hollow, microspheres ranging from about 5 to about 300 microns in diameter and further characterized by a specific gravity of from about 0.35 to about 0.7; a true particle density of from about 0.4 to about 0.6 grams per cubic centimeter; a bulk density of from about 11 to 25 pounds per cubic foot; a melting point of 1200° C.; a MOH's particles hardness of about 5; a shell thickness which is about 10 percent of the particle radius; and a composition which includes from about 55–60 percent by weight silica ($SiO_2$); 30–35 percent by weight alumina ($Al_2O_3$); 4–10 percent by weight iron oxide ($Fe_2O_3$); and about 1–3 percent by weight of alkali and alkaline earth metals or their oxides, wherein the relationship between the operating pressure in the extruder and temperature increase ($\Delta T$) and the volume percent of the hollow microsphere filler particles is expressed in terms of the following table:

| Volume (%) of Microspheres | Extrusion Operating Pressure (psi) | $\Delta T$ (°C.) |
| --- | --- | --- |
| 5–20 | 1600 | 80 |
| 25 | 1550 | 90 |
| 30 | 1500 | 100 |
| 35 | 1430 | 110 |
| 40 | 1350 | 120 |
| 45 | 1210 | 140 |
| 50 | 1100 | 150 | wherein $\Delta T$ represents the difference between the temperature of the polymer resin in the extruder and the polymer temperature before it enters the extruder, the minimum diameter of said die being not less than one-sixteenth inch.

* * * * *